Oct. 2, 1962    G. M. BEAUMONT    3,056,742
METHOD AND APPARATUS FOR SEWAGE DISPOSAL
Filed Nov. 14, 1957    12 Sheets-Sheet 1

INVENTOR
GERALD M. BEAUMONT
By Fetherstonhaugh & Co.
ATTORNEYS.

INVENTOR
GERALD M. BEAUMONT
By Fetherstonhaugh + Co.
ATTORNEYS

Oct. 2, 1962 G. M. BEAUMONT 3,056,742
METHOD AND APPARATUS FOR SEWAGE DISPOSAL
Filed Nov. 14, 1957 12 Sheets-Sheet 11

INVENTOR
GERALD M. BEAUMONT
By Fetherstonhaugh & Co.
ATTORNEYS.

Oct. 2, 1962 G. M. BEAUMONT 3,056,742
METHOD AND APPARATUS FOR SEWAGE DISPOSAL
Filed Nov. 14, 1957 12 Sheets-Sheet 12

INVENTOR
GERALD M. BEAUMONT
BY Featherstonhaugh + Co.
ATTORNEYS.

United States Patent Office 3,056,742
Patented Oct. 2, 1962

3,056,742
METHOD AND APPARATUS FOR SEWAGE DISPOSAL
Gerald M. Beaumont, Saskatoon, Saskatchewan, Canada, assignor to Underwood McLellan and Associates Limited, Saskatoon, Saskatchewan, Canada
Filed Nov. 14, 1957, Ser. No. 696,399
21 Claims. (Cl. 210—15)

This invention relates to domestic sewage treatment and more particularly to the complete treatment of domestic sewage in a self-contained unit adapted to service a dwelling and produce clarified aseptic effluent for disposal or re-use.

Domestic sewage disposal presents a serious problem in areas not serviced by adequate sewer facilities. In rural areas where the water table is low and water shortages occur over long periods, the problem of the volume of water consumption also arises. The high cost of providing adequate water supplies in large communities is another outstanding problem.

A number of attempts have been made to meet these problems by the provision of domestic sewage treatment units, septic tanks, cess pools, systems of above ground and below ground filters, and re-circulation of effluent for re-use in certain household units. Although in some instances widely used, these previous methods have been generally characterized by inefficient operation, incomplete sewage treatment and unpleasant and tedious periodic maintenance. Prior systems which have returned effluent for use in household units have required special installation in the units.

The principal purpose of the present invention is to provide effective and economic treatment of domestic wastes with a high degree of purification and without odours or any other objectionable features associated with the treatment unit, the treatment unit being located within or near the dwelling which it services.

Another important purpose of the invention is to provide a purified effluent from the sewage treatment process which can be re-used in certain household units such as water closests to effect a substantial saving in water consumption, the saving for the average household being 45 to 50% of consumption.

A further purpose of the invention is to provide a package-type domestic sewage treatment unit which can be used in conjunction with storm or run-off drainage systems, replacing costly community sewage treatment plants.

The invention provides a single dwelling treatment unit comprising a treatment tank, a pair of upwardly and outwardly extending baffles positioned within the tank and separating the tank into a central aeration zone and two clarification zones, an effluent inlet opening into the central aeration zone of the tank adjacent the top thereof but below the surface level of effluent therein, fluid distribution means extending to the tank adjacent the bottom thereof, effluent outlets opening from the clarification zones, means to deliver fluid into the fluid distribution means for circulation in the tank, and a vent opening from the top of the tank.

The invention will now be described with respect to the accompanying drawings in which.

Figure 1:
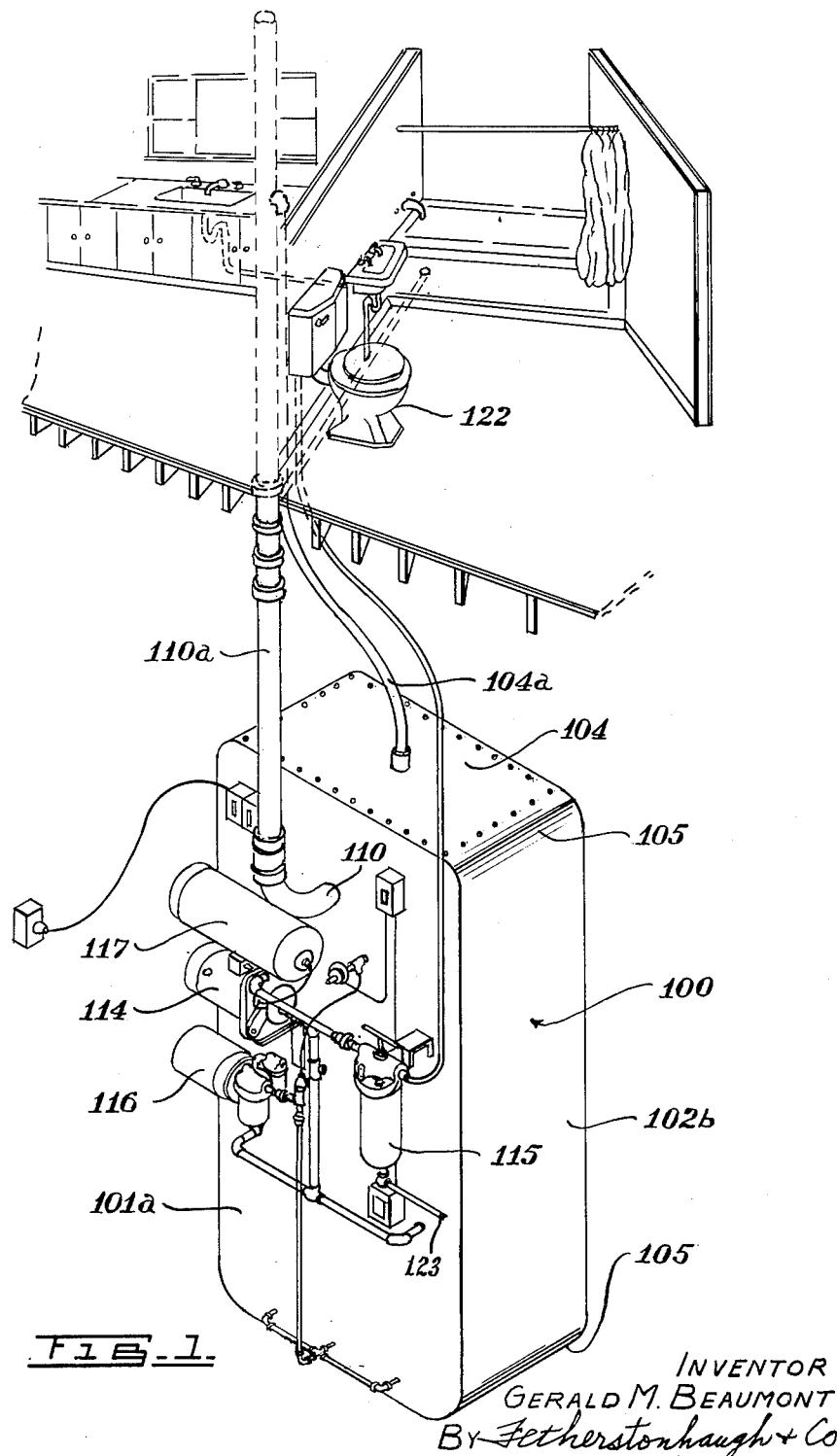
FIGURE 1 is a schematic perspective view of the treatment unit, showing the circulation of the effluent with respect to household units.

Referring to FIGURES 1 to 6 of the drawings, the aeration unit consists of a treatment tank 100 of upright rectangular shape having sides 101a, 101b, ends 102a, 102b, a bottom 103 and a top 104. The juncture of ends 102 with bottom 103 and top 104 are rounded as shown at 105.

The treatment tank 100 is divided horizontally into a central aeration zone 106 and two adjoining clarification zones 107a, 107b by two substantially vertical baffles 108a, 108b. Each of these baffles is attached to the sides 101 of the tank and extends from a position adjacent the bottom 103 and spaced from the centre line 109 of the tank to a point adjacent the ends 102 and spaced from the top 104. Thus the aeration zone 106 decreases in breadth towards its lower end while the clarification zones 107 increase in breadth towards their lower ends.

Figure 3:
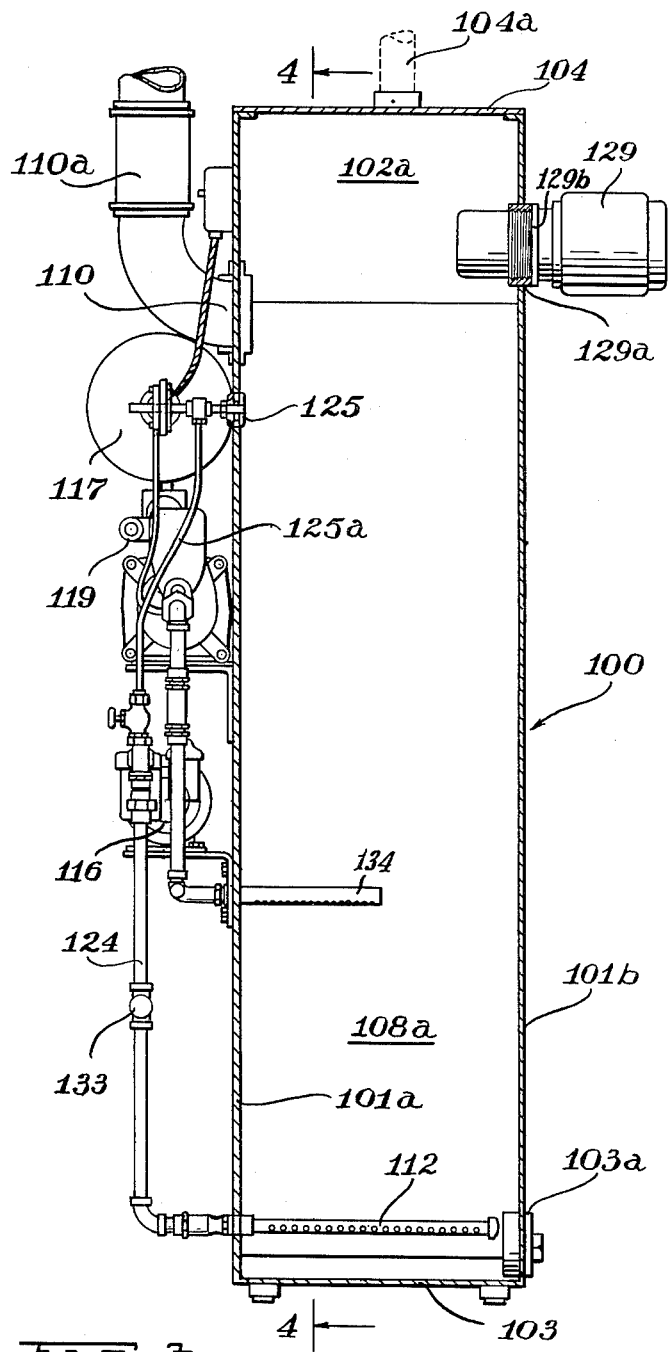
FIGURE 3 is a sectional end elevation taken along the line 3—3 of FIGURE 2.
Figure 4:
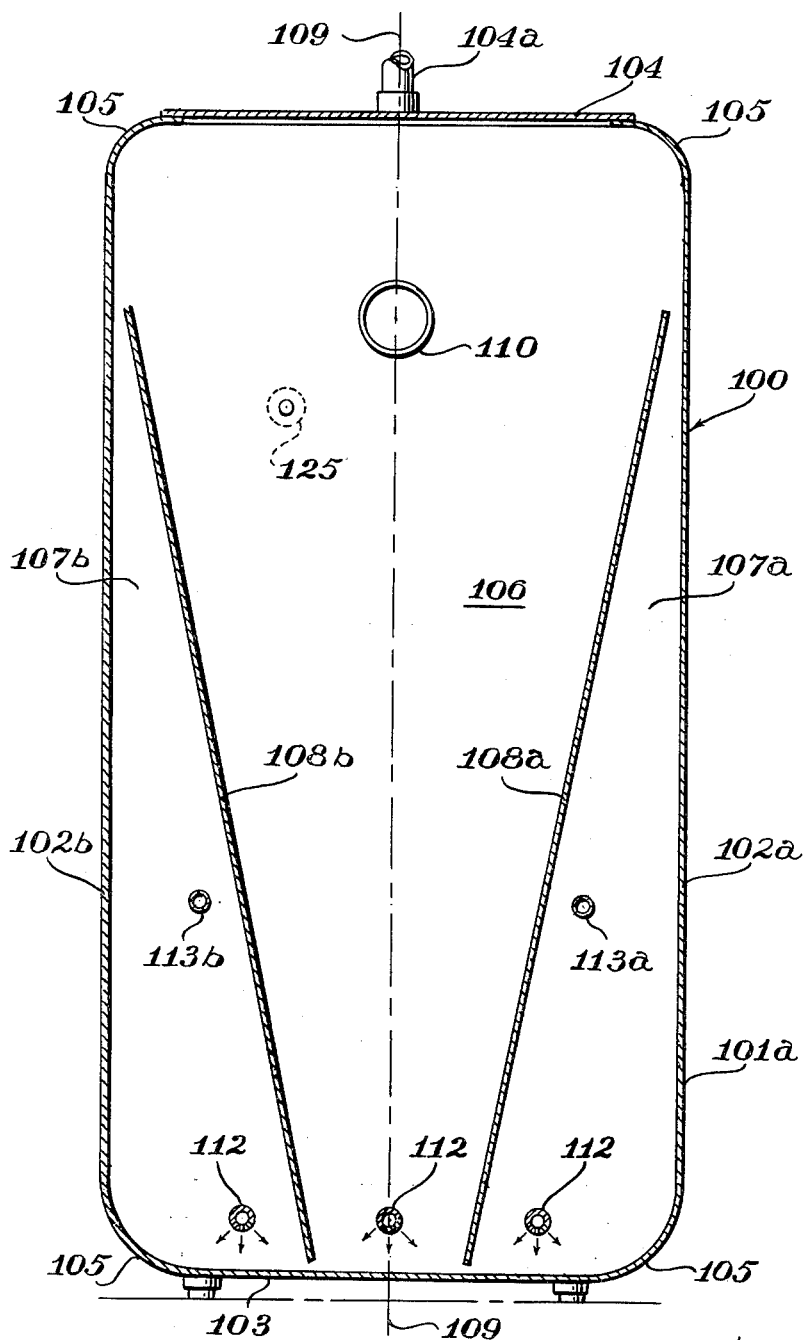
FIGURE 4 is a sectional side elevation taken along line 4—4 of FIGURE 3.
Figure 5:
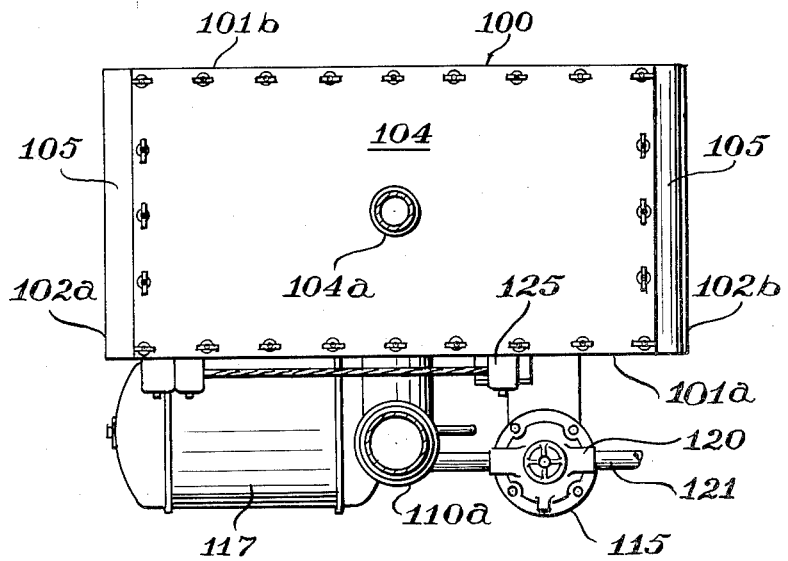
FIGURE 5 is a top plan view of the unit.
Figure 6:
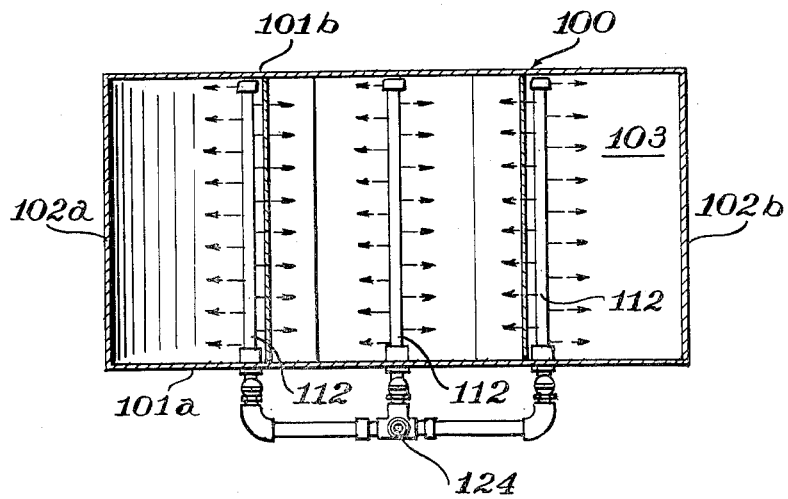
FIGURE 6 is a sectional plan view taken along line 6—6 of FIGURE 2.

A waste inlet 110, leading from a waste pipe 110a draining various household sanitary units, opens into the tank 100 through side 101a at a point spaced from the top 104 so that waste may flow into the aeration zone 106. Projecting into the tank 100 from side 101a adjacent the bottom 103 are three distributing pipes 112 which are perforated preferably as shown in FIGURE 3 along that part of their circumferences facing bottom 103. Two effluent outlets 113a and 113b open from clarification zones 107a and 107b in side 101a of tank 100 approximately ⅔ the height of the clarification zone up from bottom 103. A vent 104a opens from top 104.

Figure 2:
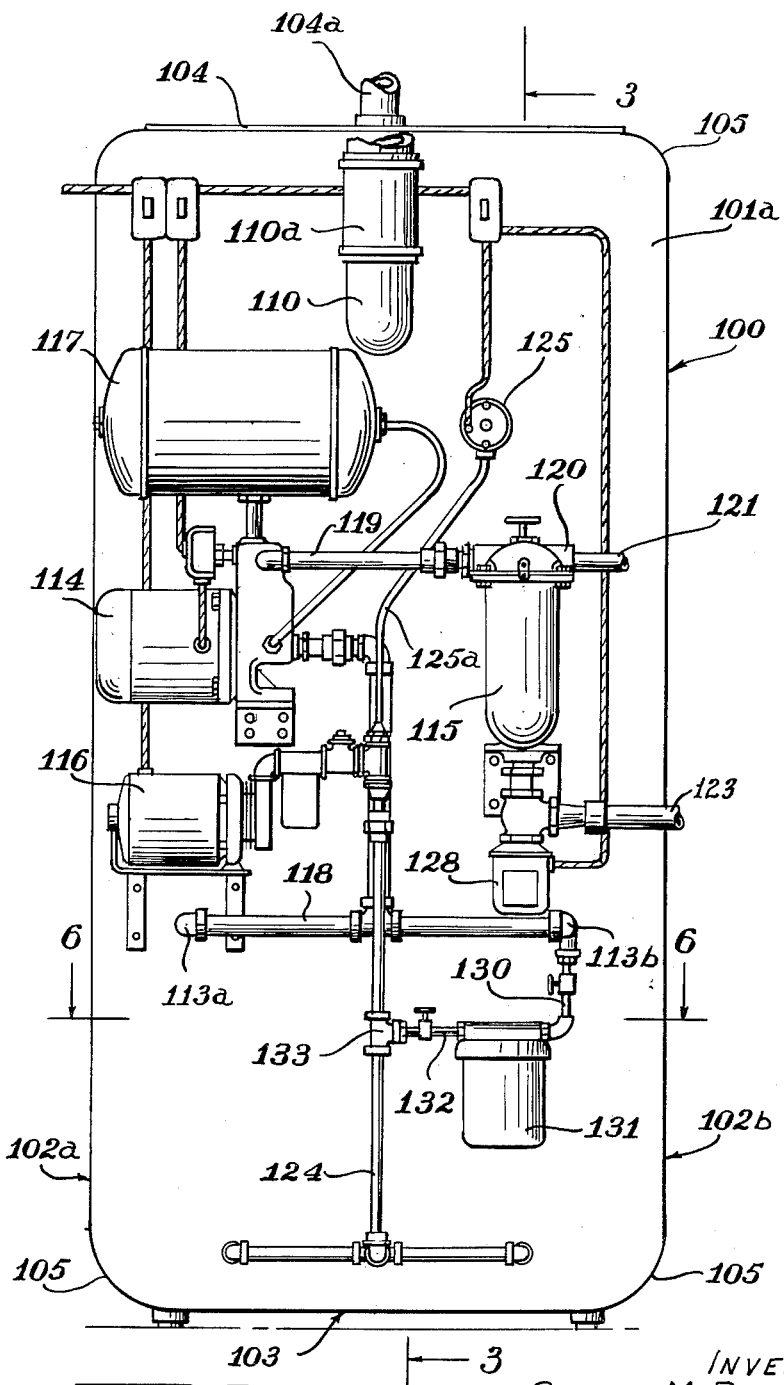
FIGURE 2 is a side elevation of the treatment unit.

As shown in FIGURE 1 and more particularly in FIGURES 2 and 3, pumping, filtering and aeration apparatus is attached to side 101a of tank 100. This apparatus, with accompanying circulation piping, consists of a pressure pump 114, a filter 115, an air compressor 116 and a pneumatic pressure tank 117. Effluent from tank 100 is drawn through pump 114 from outlets 113 through pump suction pipe 118. The effluent is then transferred from pump 114 through transfer pipe 119 to filter 115. Two outlets are associated with filter 115, one outlet 120 leading by pipe 121 to a water closet 122 and the other outlet 123 leading to disposal, whether to a septic tank or to a sewer. An air supply pipe 124 leads from air compressor 116 into distributing pipes 112.

In the operation of the treatment unit waste material or effluent from the various household units enters tank 100, via waste pipe 110a, through waste inlet 110. Inlet 110 is completely submarged at all times to prevent gas and froth escaping back through waste pipe 110a into the household units.

From air compressor 116 air enters the tank 100 through the perforations of distributing pipes 112, the pressure at the perforations being adjusted to 35 p.s.i. By this means minute air bubbles are injected into the effluent standing in the tank 100 and thse bubbles rise upwardly in aeration zone 106 and clarification zones 107. At the same time, material in the effluent entering from inlet 110 settles downwardly in aeration zone 106 and aerobic digestion of the sewage take place.

Any solids entering into clarification zones 107 are aerated by the air bubbles and carried upwardly therein and are floated out of the zones through the clearance between the top of the baffles 108 and the ends 102 of the tank. Only some "ash" will remain on bottom 103 of tank 100 and this may be cleaned out periodically, if necessary, through a clean-out port 103a in side 101b of the tank.

As mentioned above, the clarified effluent is drawn from clarification zones 107 by pump 114 through outlets 113 via suction pipes 118 and transferred to filter 115 via pipe 119. An automatic motorized valve 128 is connected with filter 115 in the outlet 123 leading to disposal. A pressure switch 125 controls the operation of valve 128. Pressure switch 125 is of the air bubbler variety, drawing pressurized air from a supply pipe 124 through a lead 125a and opening into tank 100 (see FIGURE 3). As the head on the air bubbler increases (as the level of effluent in tank 100 rises) the switch 125 closes the electrical circuit opening the motorized valve 128 and allowing effluent to pass to disposal. Similarly switch 125 closes valve 128 as the water level in tank 100 falls. The range of fluctuation of the water level in the preferred embodiment shown in the drawings is approximately two inches (2.78%). Each time effluent is discharged through valve 128, treated solids retained by filter 115 are flushed to disposal. Valve 128 may also be opened manually by a toggle switch.

The pneumatic pressure tank 117 allows intermittent operation of the pump 114 while providing continuous pressure in the circulation system of the unit.

It will be noted that there are two draw-off or effluent ports comprising outlets 113. This serves to reduce the effect of clogging of the outlets and associated suction piping 118. Thus if one effluent outlet 113a or 113b or associated piping should clog the pressure will be relieved by the other outlet until the restriction is reduced or eliminated.

Outlets 113a and 113b may carry perforated pipes 134 projecting into clarification zones 107. These pipes 134 accommodate bacteria growth which act as a filter of the effluent being drawn through the outlets. Since pipes 134 are located in the quiescent zones of treatment tank 100, no scouring of the bacteria growth will take place. Build-up of bacteria growth on pipes 134 will normally stabilize but may be cleaned by back-flushing.

A grinder 129 is attached to tank 100 adjacent top 104 and is positioned to have its inlet project into the tank at the surface level of the effluent. The grinder may be attached to side 101a by threading it into an opening provided for the purpose. The outlet 129a of the grinder is positioned below the surface level of the effluent. Solids at the surface of the effluent, maintained there by flotation, are drawn into the grinder, thoroughly cut up, and discharged below the surface as shown in FIGURE 3. In addition to actual grinding of the solids, grinder 129 provides for complete mixing and circulation of the top layer of effluent control of froth formation, and control of scum formation, thus assisting in the process of stabilization of the effluent within the tank. The position of the grinder 129 ensures that only floating solids will be delivered to it; heavy solids such as metals will fall to the bottom of the tank and accumulate with the "ash."

Grinder 129 may include a timing mechanism for intermittent operation and is fitted with a gas-tight seal 129b.

Chlorination, in addition to aerobic treatment, is considered necessary to completely disinfect the effluent for re-use to control odours, to reduce colour and to control nitrifaction. The chlorine also acts to retard the initial oxygen transfer in the aerobic treatment, thus increasing the efficiency of oxidation over the protracted period of retention of the effluent in the treatment tank. To accomplish this, a lead-off 130 from outlet 113b draws effluent into a dissolving chamber 131 which contains a chlorine compound and is capable of being recharged. From chamber 131 a feed pipe 132 feeds the chlorinated effluent into an aspirator 133 positioned in air supply pipe 124. Thus the chlorine solution is fed at a slow rate into the air supply to tank 100, the chlorine being intimately mixed with the air supply and distributed into the treatment tank through distributing pipe 112. Of course the chlorine must not be added in sufficient quantity to have a detrimental effect on the aerobic oxidation process in the treatment unit. A suggested rate of addition of chlorine is 1.0–1.5 p.p.m. depending on rate of sewage flow.

As an alternative, the flush tank of the water closet may be used as a chlorine contact chamber for disinfection of recirculated, aerobically oxidated effluent. An automatic dispenser such as a "Serf-O-Let" (a trademark) may be employed. Chlorine solution is fed into the water closet tank at each flush at a dosage to obtain adequate disinfection of the flush volume of recirculated effluent. The chlorine returns to the treatment tank 100 with the sewage waste and therefore must be fed into the system at a controlled rate.

The tank 100 is designed to retain the effluent within it for a period ranging from 16 to 24 hours. It has been found, for a household unit comprising a family of five people, that a tank measuring 72″ x 36″ x 18″ is adequate. As mentioned above, the addition of chlorine reduces the amount of initial oxygen utilization, replacing "tapered aeration" by long period aeration which gives a higher average oxygen utilization resulting in more thorough oxidation, and a smaller volume of "ash." The position of the effluent outlets provides the maximum detention period besides drawing off the most clarified effluent between the solids of flotation and the solids of sedimentation.

An alternative embodiment of the invention is illustrated in FIGURES 7 to 11. This embodiment, also completely automatic, provides for two-pass aeration through the use of a pressure aeration tank introduced into the circulation system of the treatment tank. In this embodiment a treatment tank 200 has sides 201a and 201b, ends 202a and 202b, a bottom 203 and a top 204 as in the previous embodiment. The junction 205 between the ends 202, the bottom 203 and the top 204 of the tank are rounded, as before. Again, a central aeration zone 206 and two clarification zones 207a and 207b are sectioned off in tank 200 by means of baffles 208a and 208b positioned as before with relation to the centre line 209 and ends 202 of the tank. A waste inlet 210 enters tank 200 through side 201a at a point spaced from the top of the tank and discharges waste from the household units into the tank below the lowest effluent level prevailing therein. Outlets 211a and 211b lead from the clarification zones 207a and 207b adjacent the bottom 203 of the tank in side 201a thereof. A perforated distributing pipe 212 projects into the central aeration zone 206 adjacent bottom 203, as before. A vent 204a opens from top 204.

Affixed to side 201a of the tank is a motor driven pump 214, a power driven filter 215, an air compressor 216, and a pressure aeration tank 217.

An automatic pneumatic valve 218 is associated with filter 215 and a disposal lead-off 219. Valve 218 is operated by a solenoid valve 220.

In the circulation of the effluent in this embodiment, effluent from the clarification zones 207 is drawn off through outlets 211 through a pump suction pipe 221 by pump 214 and transferred by a pipe 222 to filter 215. From the filter 215 the filtered effluent may go to the water closet via lead-off pipe 222a or to a feed back pipe 223 associated with the disposal lead-off 219, feeding the effluent back into the bottom of the pressure aeration tank 217. To complete the re-circulation of the effluent to the treatment tank, a pipe 224 leads from the top of tank 217 to distributing pipe 212. A pressure relief valve 225 is positioned in pipe 224 adjacent its junction with distributing pipe 212.

The air pressure circulatory system of the treatment unit provides for air at a pressure of 15 p.s.i. to be fed into the bottom of the tank 217 from the air compressor 216 through air supply pipe 226. A suitable air distribution device 217a feeds minute air bubbles into tank 217. This air supply is carried, with the effluent, by return pipe 224 back into the treatment tank 200.

Figure 7:
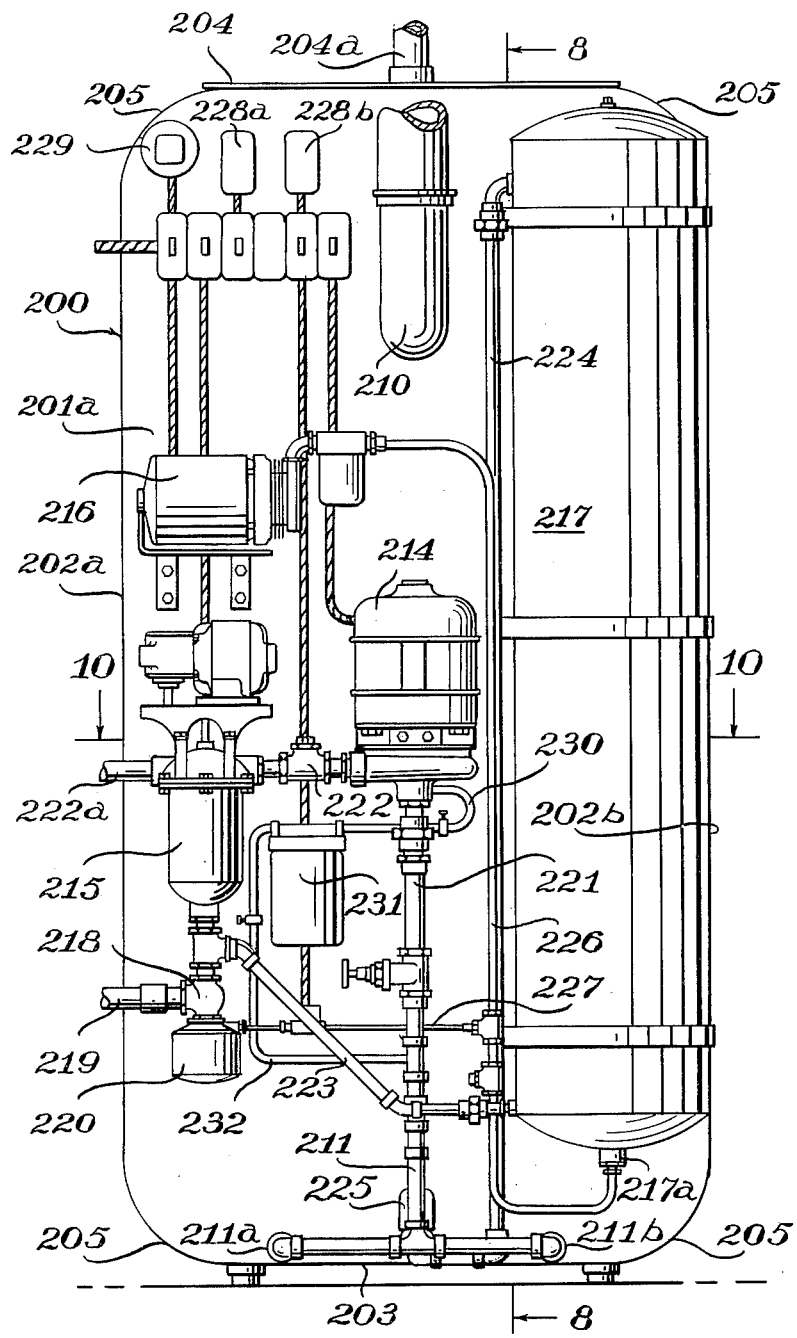
FIGURE 7 is a side elevation of another embodiment of the treatment unit.
Figure 8:
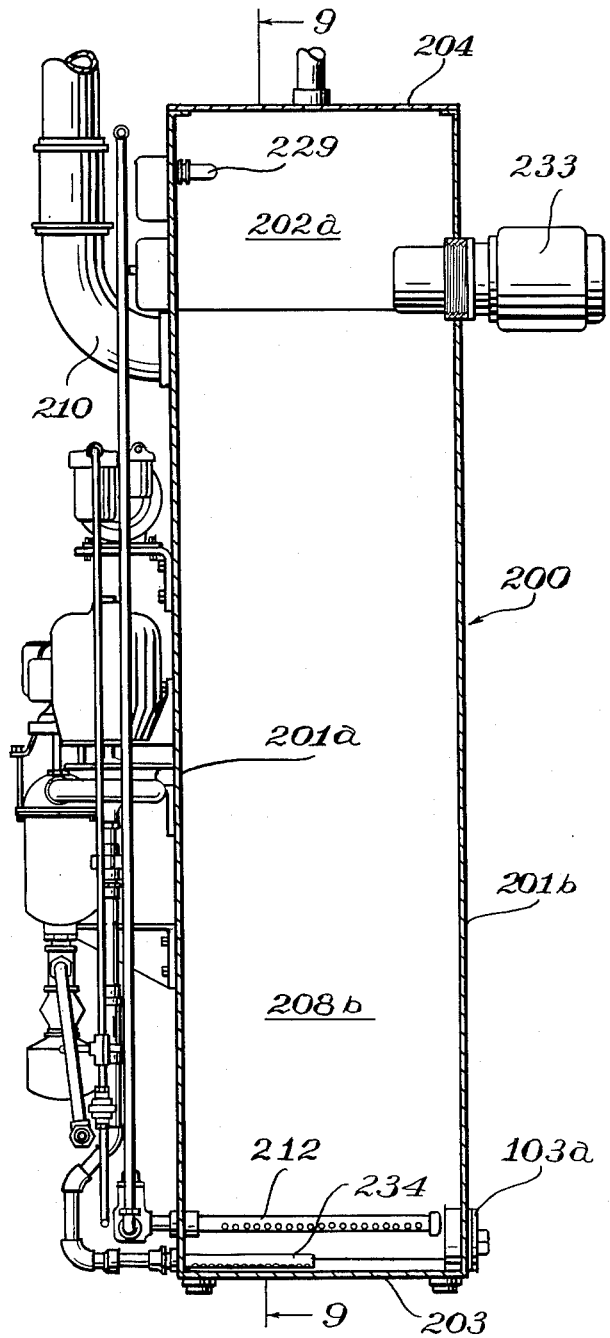
FIGURE 8 is a sectional end elevation taken along line 8—8 of FIGURE 7.
Figure 9:
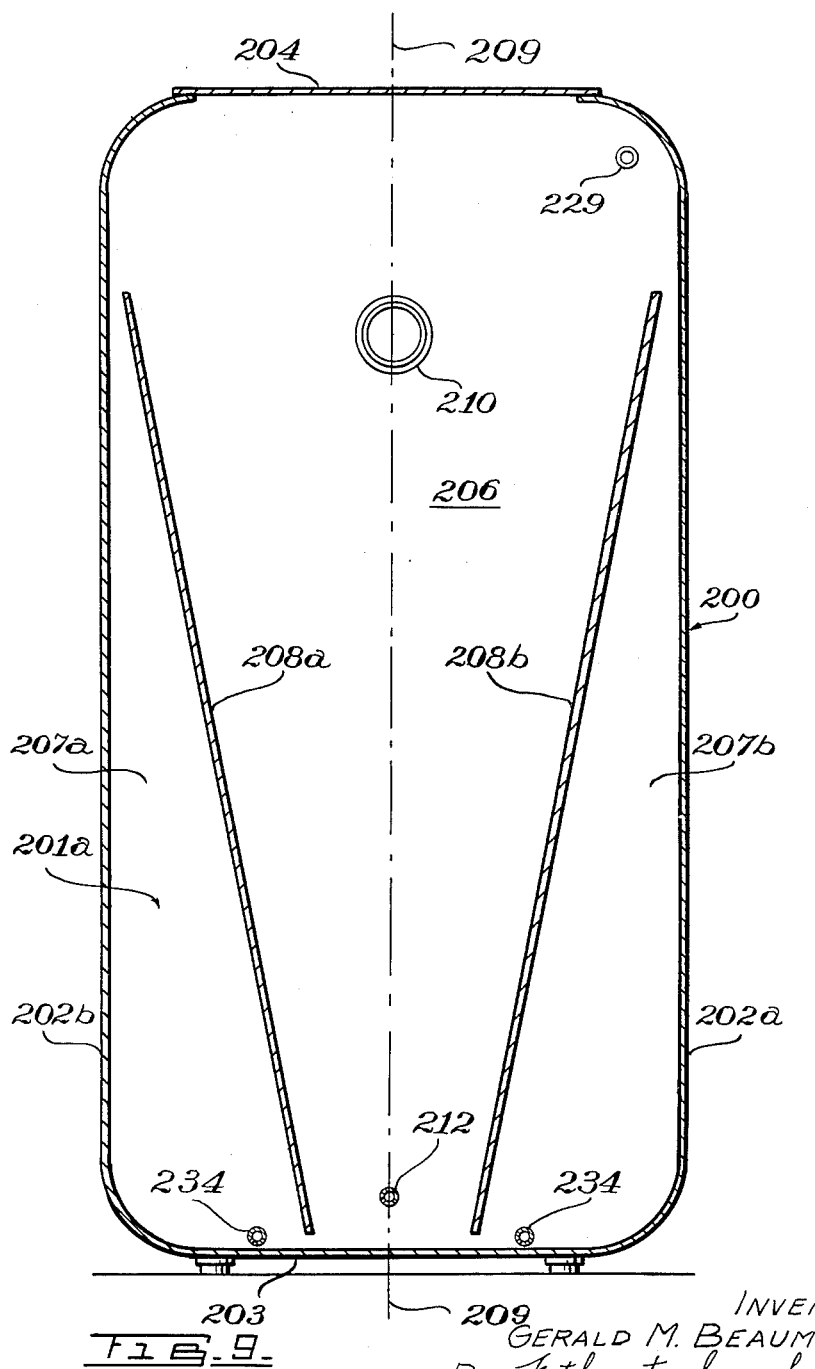
FIGURE 9 is a sectional side elevation taken along line 9—9 of FIGURE 8.
Figure 10:
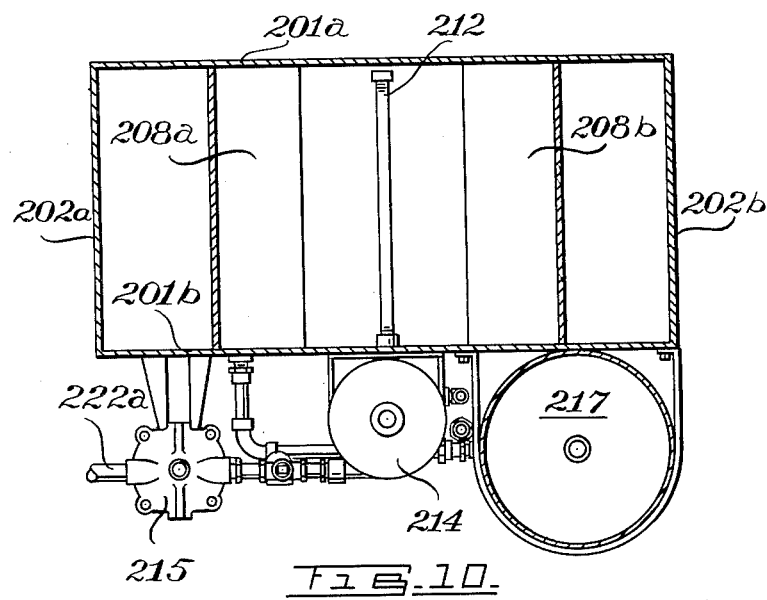
FIGURE 10 is a sectional plan view taken along line 10—10 of FIGURE 7.
Figure 11:
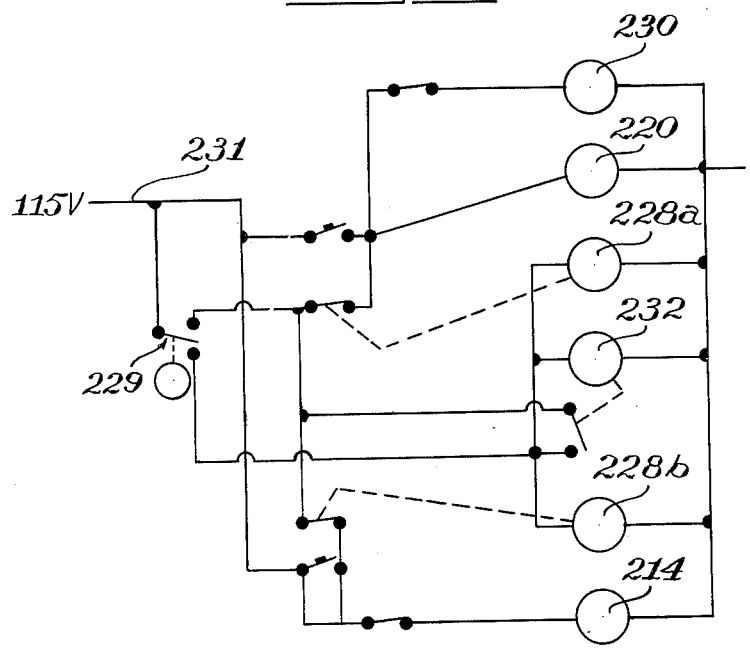
FIGURE 11 is a circuit diagram of the automatic control system of the treatment unit shown in FIGURES 7 to 11.

Referring to FIGURES 7 and 11, a two-way float switch 229 is positioned adjacent the top 204 of treatment tank 200 at the surface level of the effluent and connected with solenoid valve 220, with the motor 215a of filter 215, and with pump 214. Both the solenoid valve 220 and the automatic pneumatic valve 218 are actuated through a lead-off 227 from the air supply pipe 226. Timers 228a and 228b are connected with the pneumatic valve 218 and with the pump 214 respectively.

In the operation of the embodiment shown in FIGURES 7 to 11, the sanitary wastes from the household units enter the treatment tank 200 through inlet pipe 210, being discharged into aeration zone 206 below the water level of that zone. The baffles 208 create two clarification zones 207 as described above, providing quiescent conditions for clarification. Movement between the aeration zone 206 and the clarification zones 207 is provided at the point of separation between the baffles and the bottom 203 of the tank, but at a controlled rate. The arrangement of the baffles 108 in the treatment tank 100 provides for solids and water separation in clarification zones 107 by both sedimentation and flotation.

Effluent is periodically drawn from the bottom of the clarification zones 207 through outlets 211 by pump 214. Pump 214 delivers the effluent by way of pipes 221 and 222 to filter 215. After passing through the filter the effluent flows through feedback pipe 223 to the bottom of the pressure aeration tank 217.

As the effluent enters the bottom of tank 217 it is mixed with small air bubbles emanating from the air distribution device which is supplied through air supply pipe 226 from compressor 216. The bubbles issuing from the air distribution device cause the effluent entering the bottom of tank 217 to move to the top of the tank where it passes off, together with entrained air, through pipe 224 and relief valve 225 to distributing pipe 212 in tank 200. The relief valve 225 operates to maintain the pressure in the system at a constant value and is adjustable to that end. Besides feeding effluent from filter 215 to the pressure aeration tank 217, the pressurized system also delivers filtered effluent to the water closet for flushing through lead-off pipe 222a.

The air entering the aeration zone 206 of tank 200 through the distributing pipe 212 rises through the zone and thoroughly mixes with the waste discharged into the zone from inlet pipe 210. In this manner complete aerobic digestion of the waste is accomplished. By delivering the compressed air first to the pressure aeration tank 217 and then taking this same air to the treatment tank 200 for aerobic treatment of the waste sewage, maximum oxygen transfer is obtained since this is known as two-pass aeration.

The design of the treatment tank 200 is also intended to achieve a maximum detention of waste from inlet to outlet and thus make maximum use of the tank volume for complete aerobic treatment. Some of the air bubbles discharged downwardly from distribution pipe 212 enter clarification zones 207 through the clearance between baffles 208 and bottom 203 of the tank 200. The rate of entrance of these bubbles into zones 207 is controlled, as mentioned above, by the amount of clearance of the baffles and by the position of the perforations in pipe 212 in order to obtain quiescent conditions in zones 207.

In the operation of the device by the automatic control system illustrated in FIGURE 11, a rise in the water level in tank 200 to a predetermined height causes float switch 229 to start pump 214, at the same time opening solenoid valve 220 and also starting motor 215a of filter 215. The opening of solenoid valve 220 releases pressurized air to the pneumatic valve 218 which opens the pneumatic valve and releases effluent to disposal through lead-off pipe 219 from filter 215 (by the action of pump 214) and from aeration tank 217.

While effluent is being drawn off from the treatment unit to disposal through lead-off 219, pump 214 discharges effluent from the treatment tank 200. As the level in tank 200 drops, the float switch 229 energizes the timers 228. Timer 228a for valve 218 holds the valve open from one to three minutes to reduce the liquid level in tank 200. Timer 228b for pump 214 is set to maintain the pump in operation from three to five minutes after valve 218 is closed in order to transfer water from tank 200 to fill aeration tank 217. For the period in which pump 214 continues to operate after tank 217 is filled, an air-water mixture is circulated from tank 217 into tank 200. By providing for displacement of liquid from tank 200 below the predetermined level at which the float switch 229 operates to energize the timers 228, a predetermined waste volume can be accommodated before the float switch 229 is again actuated to start pump 214 and open solenoid valve 220.

When pump 214 is not operating, the water closet tank is filled through lead-off pipe 222a from aeration tank 217. Air compressor 216 operates continuously.

It should be noted that means (such as toggle switches) can be provided to manually start and stop the air compressor 216, the pump 214, and the filter drive motor 215a (which also manually opens and closes valve 220).

Power for the unit is supplied by an electrical cable 231 leading from a conventional power supply source. A relay 232 supplies power to all the units of the circuit.

It should be noted that automatic valve 218 may be motorized as in the first embodiment described above (see valve 128).

Apparatus for the addition of chlorine in this embodiment of the invention is shown in FIGURE 7. A lead-off 230 from pump suction pipe 221 draws effluent into a dissolving chamber 231 which contains a chlorine compound and is capable of being recharged. From chamber 231 a feed pipe 232 feeds the chlorinated effluent back into the pipe 221, thus chlorinating both the re-circulated and the excess effluent in advance of filtration. The chlorination unit operates on the differential in head in the length of pipe 221 between lead-off 230 and feed pipe 232 when pump 214 operates.

A grinder 233 may be included in this embodiment such as that indicated by numeral 129 in FIGURE 3 of the drawings, preferably being fitted in a clean-out plug on side 201b of tank 200. Also, perforated pipes 234 may be carried by outlets 211a and 211b, as before.

According to another embodiment of the invention the treatment unit may be coupled with a conventional septic tank disposal unit or connect for disposal with a storm sewer or run-off system. This embodiment is illustrated in FIGURES 12 to 16 of the drawings. As before, the treatment unit comprises a treatment tank 300 of upright rectangular construction having sides 301a and 301b, ends 302a and 302b, a bottom 303 and a top 304, the junctures 305 between the ends, bottom and top of the tank all being rounded. The interior of tank 300 is divided, as before, into a central aeration zone 306 and two clarification zones 307 by baffles 308. The baffles are positioned with relation to the centre line 309 of tank 300 as before.

A waste inlet pipe 310 opens into tank 300 in side 301a adjacent top 304. Outlets 311a and 311b lead from the clarification zones 307 adjacent the bottom 303 in side 301a and a distributing pipe 312, leading into the tank from side 301a, is positioned between baffles 308 adjacent bottom 303 in the aeration zone 306. A waste outlet 317 leads from tank 300 in side 301b opposite waste inlet pipe 310 adjacent top 304. Waste outlet pipe 317 projects into tank 300 to the centre thereof and has an effluent pipe 318 depending from it into the aeration zone 306. A T-pipe 319 at the lower end of pipe 318 projects through baffles 308a and 308b into the clarification zones 307 at a point above the distributing pipe 312. The outlet 317 may lead into a conventional septic tank unit or into a run-off system, as mentioned above. A vent 304a opens from top 304.

Affixed to side 301a of tank 300 is a centrifugal circulation pump 314 and a filter 315. A suction pipe 321 leads from outlets 311 to pump 314 through a fluid induction assembly 322 comprising an air inlet pipe 323 and a venturi valve (not shown). A transfer pipe 325 connects the pump 314 with the filter 315 and a return pipe 326 connects with the distributing pipe 312 through a pressure relief valve 327.

In the operation of this embodiment of the invention waste is discharged into tank 300 through waste inlet pipe 310, moving downwardly through aeration zone 306. Effluent is drawn from the clarification zones 307 through outlets 311 and suction pipe 321 by pump 314. As the effluent passes through the venturi valve air is entrained from air inlet pipe 323. The effluent is transferred to the filter 315 through transfer pipe 325 where it is filtered and returned to the central aeration zone 306 through return pipe 326, pressure relief valve 327 and distributing pipe 312.

The air entrained in the effluent which is discharged into aeration zone 306 moves upwardly through tank 300, aerating the waste material and carrying solids, grease and scum to the top of the tank where they are digested. Solids which have settled to the bottom 303 of tank 300 are returned to the aeration zone 306 for treatment by the re-circulation system, filterable solids being removed during re-circulation by filter 315. Excess effluent in the system passes through T-pipe 319 and pipe 318 to outlet 317 by gravity overflow. The position of T-pipe 319 projecting into clarification zones 307 ensures that the most clarified effluent will be drawn off from the system. Being aseptic, no further treatment of the effluent is necessary.

Centrifugal circulation pump 314 provides a discharge head of 10 to 15 p.s.i. Pump 314 also mixes the air entrained in the assembly 322 thoroughly with the water by mechanical shear so that very small air bubbles are produced. The pressure is maintained in the air water mixture by relief valve 327 until the mixture is discharged into tank 300 by the distributing pipe 312, thus ensuring a minimum air bubble size on admission into aeration zone 306.

As an alternative to the use of fluid induction assembly 322, an air compressor 316 may be employed, feeding air into distribution pipe 312 through pipe 316a.

The fluid induction assembly 322 may, as an alternative to the use of air, draw gas from vent 304a and recirculate it in treatment tank 300 thus providing gases of flotation but not aeration.

Figure 12:
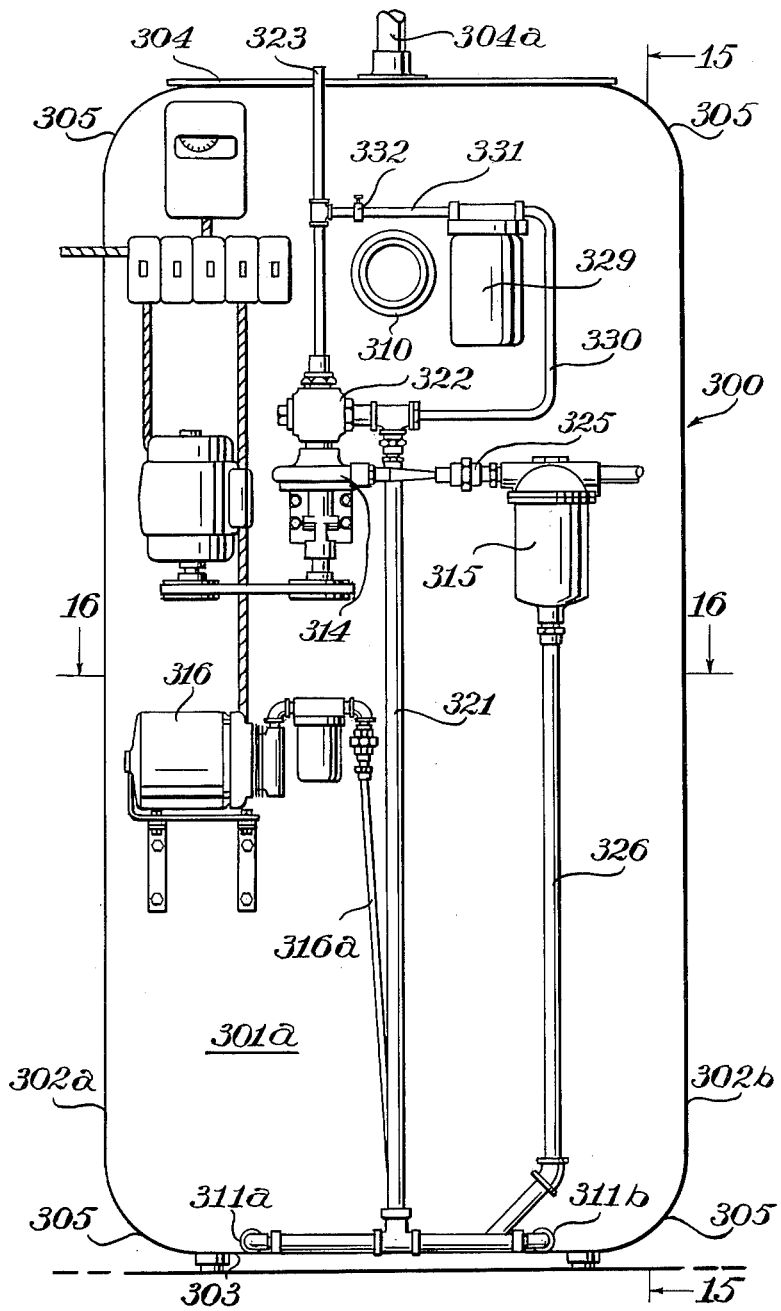
FIGURE 12 is a side elevation of a further embodiment of the treatment unit.
Figure 13:
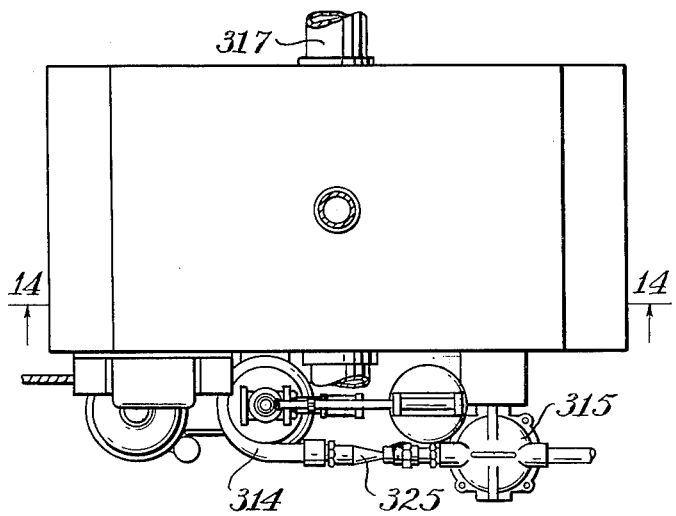
FIGURE 13 is a top plan view of the further embodiment.
Figure 16:
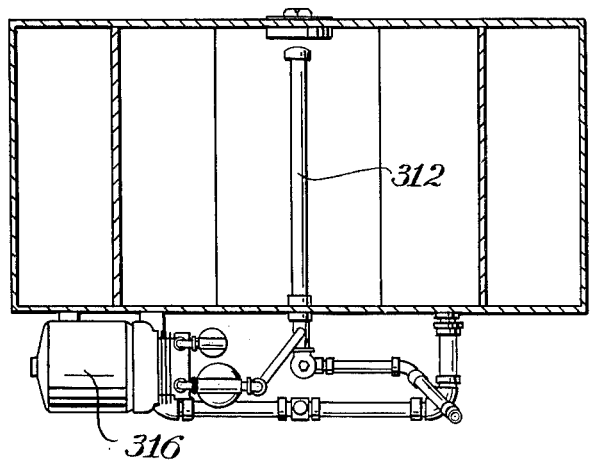
FIGURE 16 is a sectional plan view taken along line 16—16 of FIGURE 12.

The addition of a chlorination unit in this embodiment of the invention is accomplished as shown in FIGURE 12 wherein a container 329 is fed through a connection 330 leading from the pump suction pipe 321. After the effluent has been mixed in the dissolving chamber 329 with a chlorine compound, it is fed at a controlled rate through feed pipe 331 into the air inlet pipe 323, the rate of flow of chlorine-carrying effluent being controlled by a pinch-cock 332.

As an alternative embodiment of the chlorine injection unit, the flushed tank of the water closet may serve as a chlorine contact chamber as before.

Figures 14, 15:
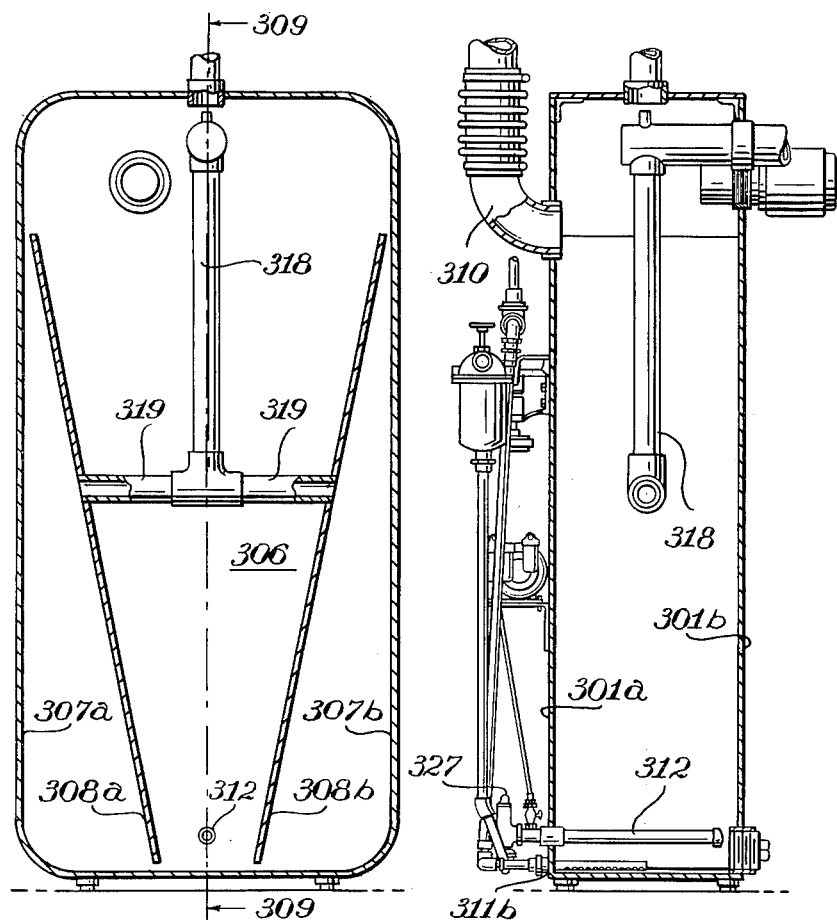
FIGURE 14 is a sectional side elevation of the further embodiment taken along line 14—14 of FIGURE 13.
FIGURE 15 is a sectional end elevation taken along line 15—15 of FIGURE 12.

As before, a grinder 333 (such as that indicated by numeral 129 in FIGURE 3) may be included in this embodiment, preferably being fitted in a clean-out plug on side 301b of tank 300 as shown in FIGURE 15. Also, perforated pipes 334 may be carried by outlets 311a and 311b, as before.

What I claim as my invention is:

1. A single dwelling sewage treatment unit comprising a closed treatment tank divided into an aeration chamber and an adjacent clarification chamber directly communicative with each other at their top ends but below the effluent level in said tank and directly communicative with each other at their bottom ends, the horizontal cross-sectional area of said aeration chamber increasing as its distance from the bottom of said aeration chamber increases and the horizontal cross-sectional area of said clarification chamber decreasing as its distance from the bottom of said clarification chamber increases; a sewage inlet opening into said aeration chamber adjacent the top end thereof but below the surface level of effluent therein; an effluent outlet opening from said clarification chamber; fluid distribution means extending and opening into said tank adjacent the bottom thereof for distributing air into said aeration and clarification chambers; and a vent opening from the top of said tank.

2. A single dwelling sewage treatment unit comprising a closed treatment tank divided into a central aeration chamber and two clarification chambers, one on each side of said aeration chamber, said clarification chambers being directly communicative with said aeration chamber at the top ends thereof but below the effluent level in said tank and being directly communicative with said aeration chamber at the bottom ends thereof, the horizontal cross-section area of said aeration chamber increasing as its distance from the bottom of said aeration chamber increases and the horizontal cross-sectional areas of said clarification chambers decreasing as their distance from the bottom of said clarification chamber increases; a sewage inlet opening into said aeration chamber adjacent the top end thereof but below the surface level of effluent therein; effluent outlets opening from each of said clarification chambers; fluid distribution means extending and opening into said tank adjacent the bottom thereof for distributing air into said aeration and clarification chambers; and a vent opening from the top of said tank.

3. A treatment unit as claimed in claim 2 wherein the effluent outlets are positioned centrally of the clarification zones.

4. A treatment unit as claimed in claim 2 wherein the fluid distribution means comprises at least one perforated pipe positioned in the central aeration zone of the tank.

5. A treatment unit as claimed in claim 2 including a grinder opening into the tank and adapted to draw effluent from adjacent its surface level in the tank and re-discharge the effluent into the tank below the surface level therein.

6. A treatment unit as claimed in claim 2 wherein the fluid delivery means comprises an air compressor.

7. A treatment unit as claimed in claim 2, wherein the effluent outlets lead to a pressure pump and thence to a filter, an outlet conduit leading from said filter and adapted to deliver effluent to at least one household unit for re-use, and an outlet conduit leading from said filter and adapted to deliver excess effluent to disposal.

8. A treatment unit as claimed in claim 7 including a normally closed valve in said filter outlet conduit adapted to deliver excess effluent to disposal, a switch in the treatment tank actuating the valve to maintain the volume of effluent within the unit within predetermined limits.

9. A treatment unit as claimed in claim 2 including means to deliver chlorine into the effluent therein, said chlorine delivering means comprising a chlorine dissolving chamber, a lead-off from one of the effluent outlets to the dissolving chamber, and a feed pipe from the dissolving chamber to an aspiration in the fluid delivery means.

10. A treatment unit as claimed in claim 2 wherein the effluent outlets lead through a pressure pump to a pressure-aeration tank, the outlet from the pressure-aeration tank leading to the fluid distribution means, and said means to deliver fluid comprising an air compressor feeding into the pressure aeration tank.

11. A treatment unit as claimed in claim 10 including a filter positioned between the pressure pump and the pressure-aeration tank, an outlet from the filter delivering effluent to at least one household unit for re-use, and an outlet from the filter delivering excess effluent to the disposal.

12. A treatment unit as claimed in claim 11 including a valve in the filter outlet delivering excess effluent to disposal, a switch in the treatment tank actuating the valve to maintain the volume of effluent within the treatment unit between predetermined limits.

13. A treatment unit as claimed in claim 2 in which the means to deliver fluid comprises a pump, a suction pipe connecting the effluent outlets with the pump, said suction pipe having a fluid induction assembly therein.

14. A treatment unit as claimed in claim 13, in which the fluid induction assembly is an air inductor.

15. A treatment unit as claimed in claim 13 in which the fluid induction assembly is connected with the vent opening from the top of the tank.

16. A treatment unit as claimed in claim 13, the effluent outlets being connected with a gravity discharge pipe leading to disposal.

17. A treatment unit as claimed in claim 16, including a filter in series between the pump and the fluid distribution means, one outlet of the filter leading to at least one household unit for re-use.

18. A method of treating sewage by long period bacteriological treatment which comprises providing a treatment tank having an aeration chamber and a clarification chamber communicative with each other at their top ends but below the effluent level in said tank and communicative with each other at their bottom ends, the horizontal cross-sectional area of said aeration chamber increasing as its distance from the bottom of said aeration chamber increases and the horizontal cross-sectional area of said clarification chamber decreasing as its distance from the bottom of said clarification chamber increases, retaining the effluent in the treatment tank over a period of between 16 and 24 hours, aerating the effluent in the treatment tank, introducing controlled amounts of chlorine into the effluent to reduce the initial rate of oxygen transfer to obtain a less tapered rate of oxidation over said period and discharging the effluent from the clarification zones.

19. A method as claimed in claim 18 wherein the chlorine is added to the effluent, at a rate of between 1.0 and 1.5 parts per million.

20. A method as claimed in claim 18 wherein the effluent discharged from the clarification zone is filtered and re-used.

21. A method as claimed in claim 23 in which the effluent circulates from the treatment tank through a pressure-aeration tank and is thereafter returned to the treatment tank.

References Cited in the file of this patent

UNITED STATES PATENTS

| | | |
|---|---|---|
| Re. 24,219 | Pirnie | Sept. 19, 1956 |
| 244,569 | Dunagan | July 19, 1881 |
| 691,365 | Dittler | Jan. 21, 1902 |
| 1,348,320 | Rice | Aug. 3, 1920 |
| 1,644,532 | Ledyard et al. | Oct. 4, 1927 |
| 2,024,345 | Elrod | Dec. 17, 1935 |
| 2,242,652 | Maxwell | May 20, 1941 |
| 2,320,512 | Daily | June 1, 1943 |
| 2,364,023 | Green | Nov. 28, 1944 |
| 2,473,323 | Zack | June 14, 1949 |
| 2,666,740 | Gordon | Jan. 19, 1954 |
| 2,709,680 | Watson | May 31, 1955 |
| 2,709,681 | Wright | May 31, 1955 |
| 2,713,026 | Kelly et al. | July 12, 1955 |
| 2,771,416 | Ryan | Nov. 20, 1956 |
| 2,777,816 | Schumacker et al. | Jan. 15, 1957 |
| 2,786,025 | Lamb et al. | Mar. 19, 1957 |
| 2,798,228 | Boester | July 9, 1957 |

FOREIGN PATENTS

| | | |
|---|---|---|
| 433 | Great Britain | of 1910 |
| 174,380 | Great Britain | Jan. 25, 1923 |